(12) United States Patent
Suzuki

(10) Patent No.: US 7,796,217 B2
(45) Date of Patent: Sep. 14, 2010

(54) LIQUID CRYSTAL DISPLAY PANEL, METHOD OF INSPECTING THE SAME, AND INSPECTION APPARATUS USED FOR THE SAME

(75) Inventor: Hidehiko Suzuki, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 629 days.

(21) Appl. No.: 11/085,464

(22) Filed: Mar. 21, 2005

(65) Prior Publication Data
US 2006/0050206 A1 Mar. 9, 2006

(30) Foreign Application Priority Data
Sep. 9, 2004 (JP) ............... 2004-262222

(51) Int. Cl.
G02F 1/1333 (2006.01)
G02F 1/1339 (2006.01)

(52) U.S. Cl. .............. 349/110; 349/111; 349/153; 349/190

(58) Field of Classification Search .......... 349/153, 349/190, 110–111
See application file for complete search history.

(56) References Cited

U.S. PATENT DOCUMENTS

| | | | |
|---|---|---|---|
| 5,852,484 A * | 12/1998 | Inoue et al. | 349/86 |
| 6,055,035 A * | 4/2000 | von Gutfeld et al. | 349/187 |
| 6,095,203 A * | 8/2000 | Yamamoto et al. | 141/59 |
| 6,268,895 B1 * | 7/2001 | Shimada et al. | 349/110 |
| 6,738,125 B2 * | 5/2004 | Yamada et al. | 349/156 |
| 6,801,288 B1 * | 10/2004 | Ashizawa et al. | 349/149 |
| 7,167,224 B1 | 1/2007 | Takeda et al. | |
| 7,202,932 B2 * | 4/2007 | Niwa et al. | 349/154 |
| 7,230,669 B1 * | 6/2007 | Tashiro et al. | 349/153 |
| 2003/0071959 A1 * | 4/2003 | Koyama | 349/156 |

FOREIGN PATENT DOCUMENTS

| | | | |
|---|---|---|---|
| JP | H05-333314 | | 12/1993 |
| JP | 07140483 A | * | 6/1995 |
| JP | H09-127547 | | 5/1997 |
| JP | 10-268285 | | 10/1998 |
| JP | 11-101991 | * | 4/1999 |
| JP | H11-258606 | | 9/1999 |
| JP | 2002-006328 | | 1/2002 |
| JP | 2002-122870 | | 4/2002 |

(Continued)

*Primary Examiner*—Hoan C Nguyen
(74) *Attorney, Agent, or Firm*—Greer, Burns & Crain, Ltd.

(57) ABSTRACT

A liquid crystal display panel including two substrates combined together through a sealing material applied to a peripheral portion thereof. A liquid crystal is sealed between the substrates, and there is a picture-frame area on the substrates, outside a display area and inside a region where the sealing material is formed. A light-shield film is formed in the picture-frame area in the form of a frame surrounding the display area, wherein the light-shield film does not overlap the sealing material. A first conductive film is formed in the picture-frame area on either of the substrates, outside the light-shield film, in the form of a continuously connected frame surrounding the display area and in the same layer as a pixel electrode formed at each pixel in the display area. A second conductive film is formed on the other of the substrates, facing the first conductive film.

6 Claims, 4 Drawing Sheets

FOREIGN PATENT DOCUMENTS

| | | |
|---|---|---|
| JP | 2002-156653 | 5/2002 |
| JP | 2003-248209 | 9/2003 |
| JP | 2003-280031 | 10/2003 |
| JP | 2004-045763 | 2/2004 |
| JP | 2004-212423 * | 7/2004 |

* cited by examiner

LIQUID CRYSTAL DISPLAY PANEL, METHOD OF INSPECTING THE SAME, AND INSPECTION APPARATUS USED FOR THE SAME

BACKGROUND OF THE INVENTION

1. Field of the Invention

The present invention relates to a liquid crystal display panel used as a display unit of an information apparatus, a method of inspecting the same, and an inspection apparatus used for the same.

2. Description of the Related Art

Active matrix liquid crystal displays having a thin film transistor (TFT) as a switching element at each pixel are attracting attention as the main stream of flat panel displays, and it is needed to reduce the cost of such displays by improving the yield of manufacture, reducing product failures, and simplifying manufacturing processes. An active matrix color liquid crystal display includes a TFT substrate having TFTs formed thereon, a CF substrate having color filters (CFs) formed thereon, and a liquid crystal sealed between the substrates.

At a substrate combining step of a liquid crystal display manufacturing process utilizing the dip type vacuum filling method, a sealing material is applied to a peripheral portion of either TFT substrate or CF substrate, and the substrates are pressurized and combined using a substrate combining apparatus such as a pressurizing/heating apparatus or vacuum heating apparatus to fabricate each combination of substrates having a predetermined cell gap. Thereafter, at a liquid crystal filling step, the gap between the combined substrates is filled with a liquid crystal, and a liquid crystal filling port is sealed.

The recent trend toward substrates in greater sizes has resulted in a problem in that the dip type vacuum filling method has a difficulty in forming a cell gap with high accuracy and takes a long time to fill the gap with a liquid crystal. A method for solving the problem is the one drop filling method (dispensing and combining). According to the one drop filling method, a sealing material is continuously applied to the entire periphery of either of substrates, and a prescribed amount of liquid crystal is dispensed onto the substrate or the other substrate. Subsequently, after the substrates are combined in vacuum, they are put back in the atmospheric pressure to fill a liquid crystal between them. The sealing material is thereafter cured. The use of the one drop filling method allows substrate combining and liquid crystal filling to be completed substantially at the same time and allows steps for manufacturing a liquid crystal display to be simplified significantly.

The cell gap of a liquid crystal display panel fabricated using the one drop filling method is determined by the amount of the liquid crystal dispensed. When the height of pillar spacers formed on either of the substrates is greater than the cell gap, a bubble (vacuum bubble) is generated in the liquid crystal display panel. Since the height of the pillar spacers can vary depending on various factors, it is difficult to prevent the generation of a bubble completely. A bubble tends to be generated in a picture-frame area located outside a display area in general, and a liquid crystal display panel having a bubble in the picture frame area is regarded as a defective panel because a bubble will be generated also in the display area at low temperatures. Therefore, there is a need for an in-process inspection to check whether a liquid crystal display panel has a bubble in the picture-frame area thereof or not.

At a liquid crystal filling step employing the one drop filling method, uncured sealing material can contact a liquid crystal because substrate combining and liquid crystal filling is performed simultaneously. The liquid crystal can be contaminated when an uncured component of the sealing material is in contact with the liquid crystal for a long time or exposed to a high temperature in such a state. Therefore, in general, a heat-curing resin is not used as the sealing material when the one drop filling method is employed, and a photo-curing resin which is quickly cured by being irradiated with ultraviolet light (UV light) is used instead. UV light is radiated from the side of a CF substrate formed with no metal wiring which blocks light. Since a light-shield mask (or black matrix (BM)) is formed in a picture-frame area of the CF substrate, the sealing material is applied to an outside where the BM is located. However, the BM and the sealing material can overlap each other as a result of misalignment of the substrate at a sealing material application step. Even a partial overlap between the BM and the sealing material can result in contamination of the liquid crystal because the sealing material is not irradiated with UV light and is therefore uncured in such a part. It is therefore necessary to perform an in-process inspection to check whether there is an overlap between the applied sealing material and the BM or not.

As thus described, a liquid crystal display panel fabricated using the one drop filling method must be subjected to in-process inspections on two inspection items with respect to the picture frame thereof, i.e., whether there is any bubble or not and whether there is any overlap between the sealing material and the BM. However, inspections on the two items inevitably rely on visual check by skilled inspectors. Therefore, when 100% inspection is to be carried out, the in-process inspections constitute a heavy burden and result in a problem in that the inspections can make liquid crystal display panel manufacturing steps complicated and can increase the manufacturing cost.

Patent Document 1: Japanese Patent Laid-Open No. JP-A-2003-280031

SUMMARY OF THE INVENTION

It is an object of the invention to provide a liquid crystal display panel whose picture-frame area can be easily inspected, a method of inspecting the same, and an inspection apparatus used for the same.

The above-described object is achieved by a liquid crystal display panel characterized in that it includes a pair of substrates combined together through a sealing material continuously applied to an entire peripheral portion thereof, a liquid crystal sealed between the pair of substrates, a picture-frame area in the form of a frame provided on the pair of substrates outside a display area and inside the region where the sealing material is formed, a first conductive film formed in the picture-frame area on either of the pair of substrates, and a second conductive film formed on the other of the pair of substrates and facing the first conductive film with the liquid crystal interposed between them.

The invention makes it possible to provide a liquid crystal display panel whose picture-frame area can be easily inspected, a method of inspecting the same, and an inspection apparatus used for the same.

DESCRIPTION OF THE PREFERRED EMBODIMENT

First Embodiment

Figure 1:
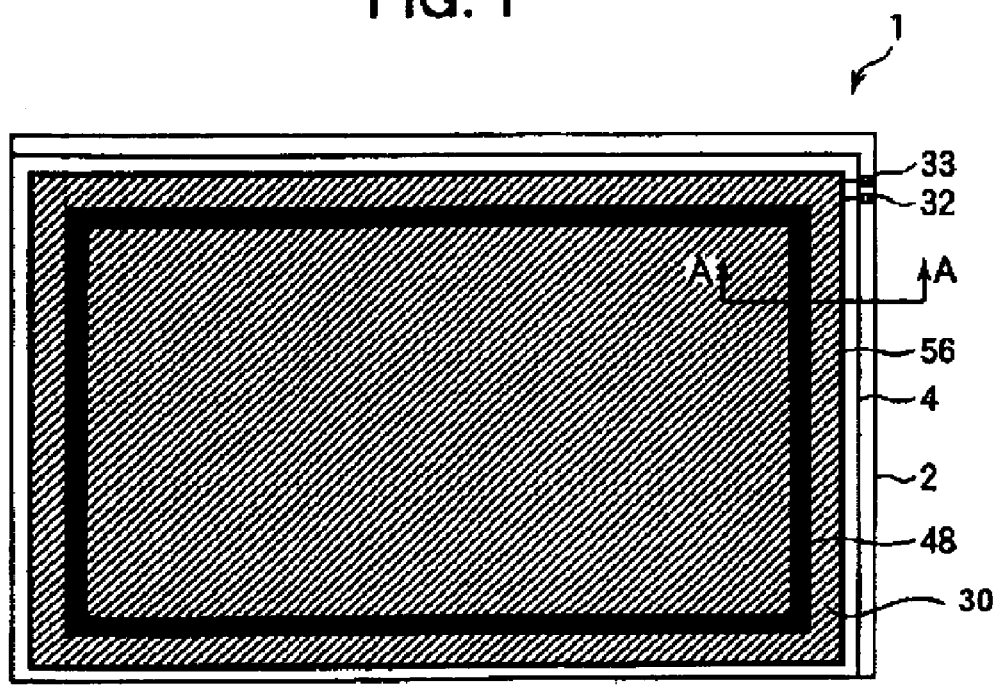
FIG. 1 shows a schematic configuration of a liquid crystal display panel according to a first embodiment of the invention.
Figure 2:
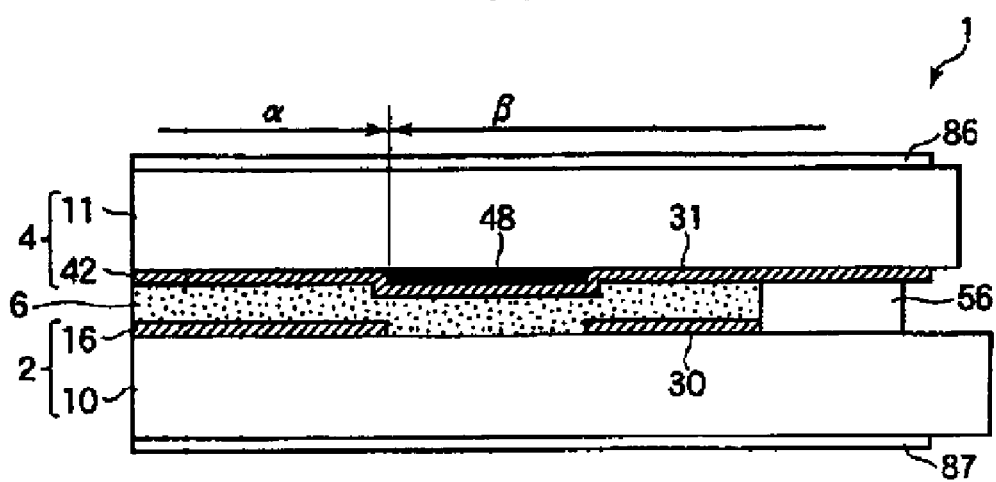
FIG. 2 is a sectional view of the liquid crystal display panel according to the first embodiment of the invention showing a schematic configuration of the same.

A description will now be made with reference to FIGS. 1 to 5 on a liquid crystal display panel, a method of inspecting the same, and an inspection apparatus used for the same according to a first embodiment of the invention. FIG. 1 shows a schematic configuration of a liquid crystal display panel 1 according to the present embodiment. FIG. 2 shows a sectional configuration of the liquid crystal display panel 1 taken along the line A-A in FIG. 1. As shown in FIGS. 1 and 2, the liquid crystal display panel 1 has a TFT substrate 2 and a CF substrate 4 which are provided opposite to each other and a VA (vertically Aligned) mode liquid crystal 6 which is sealed between the substrates 2 and 4 and which has, for example, negative dielectric constant anisotropy. The TFT substrate 2 has a pixel electrode 16 and a TFT (not shown) which are formed at each pixel on a glass substrate 10. The CF substrate 4 has a common electrode 42 and color filters (CF) (not shown) formed on a glass substrate 11. A picture-frame area β in the form of a frame surrounding a display area α is provided outside the display area a in which the pixel electrodes 16 are formed (on the right side in FIG. 2). A BM 48 for blocking light is formed like a frame in the picture frame area β on the CF substrate 4. The TFT substrate 2 and the CF substrate 4 are combined through a photo-curing (e.g., ultraviolet-curing) sealing material (main seal) 56. The sealing material 56 is applied to an entire peripheral portion of the TFT substrate 2 or CF substrate 4 that is located outside the region where the BM 48 is formed.

In the picture-frame area β that is located outside the region where the BM 48 is formed and inside the region where the sealing material 56 is formed, there is a first conductive film 30 which is formed on the TFT substrate 2 and a second conductive film 31 which is formed on the CF substrate 4 and which faces the conductive film 30 with the liquid crystal 6 interposed between them. For example, the conductive film 30 is formed from the same material and at the same time as the pixel electrodes 16 and is electrically isolated from any of the pixel electrodes 16. The conductive film 30 is formed, for example, in the form of a frame surrounding the display area α. In the present embodiment, the conductive film 31 is formed integrally with the common electrode 42 from the same material as the common electrode 42. The region where both of the conductive films 30 and 31 are formed constitutes an inspection region used for an inspection to check whether there is any bubble in the picture-frame area β or not.

A first terminal portion 32 and a second terminal portion 33 are provided on the TFT substrate 2. The terminal portion 32 is electrically connected to the conductive film 30, and the terminal portion 33 is electrically connected to the conductive film 31 (and the common electrode 42) on the CF substrate 4 through a transfer which is not shown. Thus, a desired voltage can be applied to the liquid crystal 6 in the inspection region.

A pair of polarizers 86 and 87 (not shown in FIG. 1) is provided in a crossed Nicols arrangement such that they sandwich the TFT substrate 2 and the CF substrate 4. The polarizers 86 and 87 are provided to cover the entire display area a and to cover the picture-frame area β at least in the inspection region thereof. In the present embodiment, the liquid crystal display panel 1 is in the normally black mode because the VA mode liquid crystal 6 is used.

A description will now be made on a method of inspecting whether there is any bubble in the picture-frame area β of the liquid crystal display panel 1. For example, this inspection is performed at substantially the same time as a normal operating inspection of the panel. When the panel is irradiated from behind, there is substantially zero retardation in the liquid crystal layer in a state in which no voltage is applied to the liquid crystal 6 in the inspection region. Therefore, black is displayed in the inspection region whether there is a bubble or not.

When a predetermined voltage is applied to the conductive films 30 and 31 through the terminal portions 32 and 33, a voltage is applied to the liquid crystal 6 in the inspection region, and the retardation in the liquid crystal layer becomes a predetermined value. As a result, light transmittance in the inspection region changes and, for example, white is displayed there. In a part having a bubble, black is kept displayed or luminance becomes lower than that in other parts even when a voltage is applied.

Figure 3:
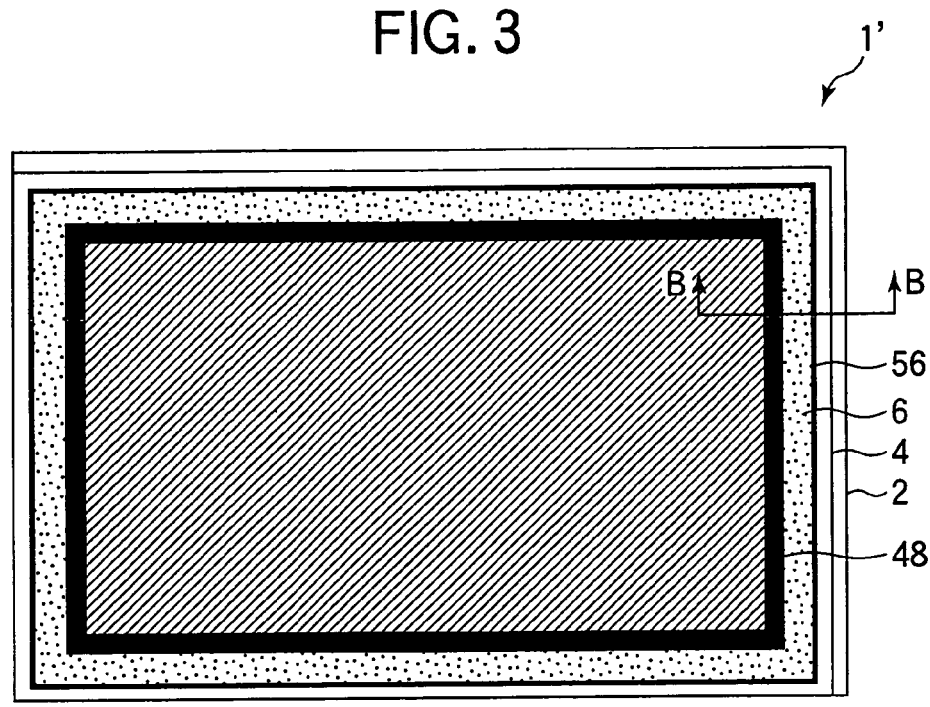
FIG. 3 is a sectional view of a liquid crystal display panel according to the related art showing a configuration of the same.
Figure 4:
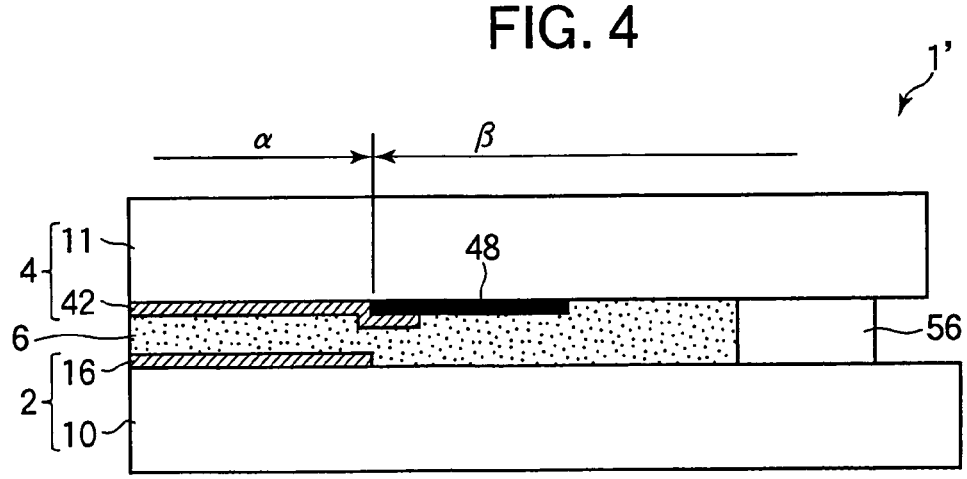
FIG. 4 is a sectional view of the liquid crystal display panel according to the related art showing a configuration of the same.

FIG. 3 shows a configuration of a liquid crystal display panel 1' according to the related art, and FIG. 4 shows a sectional configuration of the liquid crystal display panel 1' taken along the line B-B in FIG. 3. As shown in FIGS. 3 and 4, conductive films 30 and 31 as shown in FIG. 2 are not formed in a picture-frame area β of the liquid crystal display panel 1' according to the related art. Therefore, the inspection to the presence of a bubble has been difficult because black is displayed in the picture-frame β during an operating inspection whether there is a bubble or not even when a pair of polarizers is provided in the picture-frame area β.

On the contrary, the conductive films 30 and 31 are formed in the picture-frame area β of the liquid crystal display panel 1 of the present embodiment, and a voltage can be applied to the liquid crystal 6 in the inspection region in which the conductive films 30 and 31 are formed. Since the application of the voltage to the liquid crystal 6 allows light transmittance to be varied between a part having a bubble and a part having no bubble of the inspection region, it is possible to detect the presence of a bubble and the size of the bubble based on the state of display in the inspection region. For example, a liquid crystal display panel having a bubble of a size in the excess of a predetermined threshold is treated as a defective panel because it is judged that the panel will have a bubble also in its display area a at a low temperature. Since only the display area α is inspected at an operating inspection according to the related art, an operating inspection apparatus according to the related art does not have a structure to allow an inspection to be performed also on the picture-frame area β. In the present embodiment, since the picture-frame area β is inspected in addition to the display area α, the inspection apparatus used in the present embodiment preferably has a structure with a large inspection area to allow the picture-frame area β to be inspected.

Figure 5:
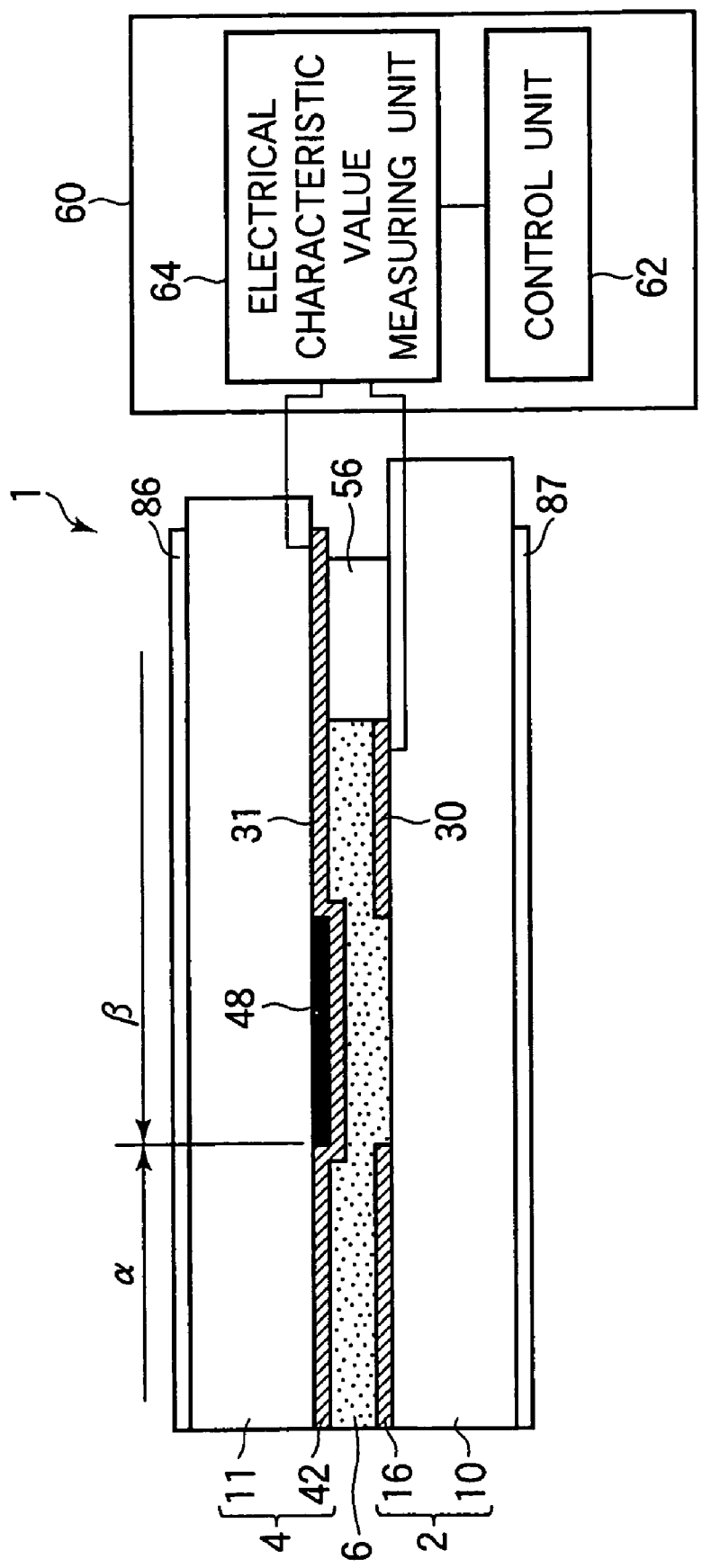
FIG. 5 shows a modification of a method of inspecting a liquid crystal display panel according to the first embodiment of the invention and a configuration of an inspection apparatus used for the same.

A description will now be made on a modification of the method of inspecting the liquid crystal display panel according to the present embodiment and an inspection apparatus used for the same. FIG. 5 shows a sectional view of the liquid crystal display panel 1 and a block diagram representing a configuration of an inspection apparatus used in the present modification. As shown in FIG. 5, an inspection apparatus 60 has an electrical characteristic value measuring unit 64 for measuring an electrical characteristic value of the inspection region and a control unit 62 for controlling the electrical characteristic value measuring unit 64. For example, the electrical characteristic value measuring unit 64 measures the electrical capacitance of a capacitor constituted by the conductive films 30 and 31 of the inspection region serving as electrodes and the liquid crystal 6 in the inspection region serving as a dielectric body. First, a predetermined voltage is applied between the conductive films 30 and 31. After the application of the voltage is stopped, the electrical characteristic value measuring unit 64 detects the charge accumulated in the conductive film 30 (31) to measure the electrical capacitance of the capacitor. Since the dielectric constant of air (a vacuum bubble) and the dielectric constant of the liquid crystal 6 are different from each other, the electric capacitance varies depending on whether there is a bubble in the inspection region or not. The control unit 62 detects the presence of a bubble and the size of the bubble based on the measured electrical capacitance and the dielectric constants of the air and the liquid crystal 6.

While the electrical capacitance of the capacitor is measured as an electrical characteristic value of the inspection region in the present modification, the electrical resistance of the liquid crystal 6 in the inspection region may alternatively be measured. Since the specific resistance of air and the specific resistance of the liquid crystal 6 are different from each other, the electrical resistance varies depending on whether there is a bubble in the inspection region or not. It is therefore possible to detect the presence of a bubble and the size of the bubble based on the measured electrical resistance and the specific resistances of the air and the liquid crystal 6.

As described above, in the present embodiment, since the presence of a bubble in a picture-frame area can be easily inspected, it is possible to simplify steps for manufacturing a liquid crystal display panel using the one drop filling method and to reduce the manufacturing cost of such a display.

Second Embodiment

Figure 6:
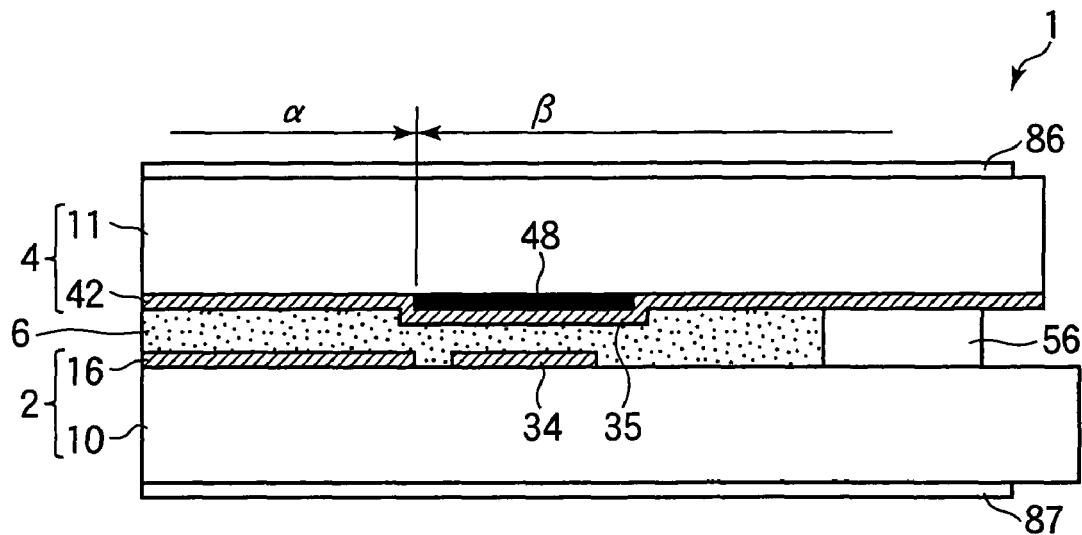
FIG. 6 is a sectional view of a liquid crystal display panel according to a second embodiment of the invention showing a schematic configuration of the same.
Figure 7:
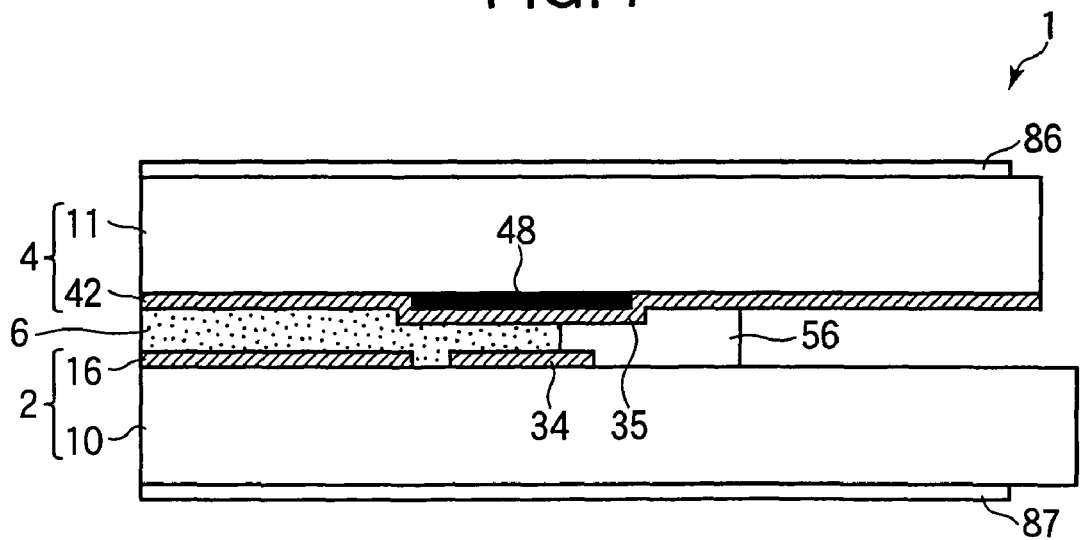
FIG. 7 is a sectional view of the liquid crystal display panel according to the second embodiment of the invention showing a state in which a sealing material and a BM overlap each other.

A description will now be made with reference to FIGS. 6 and 7 on a liquid crystal display panel and a method of inspecting the same according to a second embodiment of the invention. FIGS. 6 and 7 show sectional configurations of the liquid crystal display panel of the present embodiment taken in a position corresponding to the line A-A in FIG. 1. FIG. 6 shows a state in which a sealing material and a BM do not overlap each other, and FIG. 7 shows a state in which the sealing material and the BM overlap each other. As shown in FIG. 6, a liquid crystal display panel 1 of the present embodiment has a first conductive film 34 formed on a TFT substrate 2 and a second conductive film 35 formed on a CF substrate 4, the films being provided in a picture-frame area β. The conductive film 34 is disposed inside an outer edge of the BM 48 (on the right side of the same in the figure) such that it overlaps the BM 48 when viewed in a direction perpendicular to the substrate surface. The conductive film 35 is disposed in a region overlapping the BM 48 and in a region outside that region when viewed in the direction perpendicular to the substrate surface. For example, all of the BM 48 and the conductive films 34 and 35 overlap each other entirely at least in a certain region when viewed in the direction perpendicular to the substrate surface. The region where both of the conductive films 34 and 35 are formed constitutes an inspection region that is used for inspecting whether a sealing material 56 and the BM 48 overlap each other. It is possible to detect whether the sealing material 56 and the BM 48 overlap each other with higher accuracy by disposing the conductive film 34 and the BM 48 such that their outer edges substantially overlap each other when viewed in the direction perpendicular to the substrate surface. While the conductive film 34 is disposed inside the outer edge of the BM 48 in the present embodiment, what is required is to dispose at least either of the conductive films 34 and 35 inside the outer edge of the BM 48.

The conductive film 34 is formed from, for example, the same material as that of pixel electrodes 16, and it is electrically isolated from any of the pixel electrodes 16. For example, the conductive film 34 is formed like a frame surrounding a display area α. In the present embodiment, the conductive film 35 is formed integrally with a common electrode 42 from the same material as that of the common electrode 42. Although not shown, the TFT substrate 2 is formed with a terminal portion 32 which is electrically connected to the conductive film 34 and a terminal portion 33 which is electrically connected to the conductive film 35.

To inspect whether there is any overlap between the sealing material 56 that is an ultraviolet-curing type and the BM 48, an inspection apparatus 60 as shown in FIG. 5 is used to measure an electrical characteristic value (e.g., electrical capacitance) of the inspection region. Since the dielectric constant of the sealing material 56 and the dielectric constant of a liquid crystal 6 are different from each other, the electric capacitance is different between a case in which the sealing material 56 is not present and only the liquid crystal 6 is substantially present between the conductive films 34 and 35 as shown in FIG. 6 and a case in which the sealing material 56 is present between the conductive films 34 and 35 as shown in FIG. 7. Therefore, when the conductive film 34 (or 35) is formed in a region that overlaps the BM 48 as viewed in the direction perpendicular to the substrate surface, it is possible to detect whether there is an overlap between the sealing material 56 and the BM 48 and the width of such an overlap based on the measured electrical capacitance and the dielectric constants of the sealing material 56 and the liquid crystal 6. For example, the electric capacitance of the inspection region when only the liquid crystal 6 is present between the conductive films 34 and 35 is measured as a reference value in advance. A liquid crystal display panel is treated as a defective panel when the difference between the electric capacitance of the inspection region of the panel and the reference value exceeds a predetermined threshold because it is determined that the sealing material 56 and the BM 48 overlap each other and the liquid crystal has been contaminated by an uncured part of the seal.

While the electrical capacitance of the inspection region is measured as an electrical characteristic value of the same, the electrical resistance of the liquid crystal 6 of the inspection region may alternatively be measured. Since the specific resistance of the sealing material 56 and the specific resistance of the liquid crystal 6 are different from each other, the electric capacitance varies depending on whether the sealing material 56 is present between the conductive films 34 and 35.

It is therefore possible to detect an overlap between the sealing material 56 and the BM 48 and the width of such an overlap based on the measured electrical resistance and the specific resistances of the sealing material 56 and the liquid crystal 6.

A material having conductivity may be used as the sealing material 56. Alternatively, a conductive substance may be mixed in the sealing material 56. Since this results in shorting between the conductive films 34 and 35 when the sealing material 56 is present between the conductive films 34 and 35, it is possible to make it easier to detect whether there is an overlap between the sealing material 56 and the BM 48.

As described above, in the present embodiment, it can be easily inspected whether there is an overlap between the sealing material 56 and the BM 48. It is therefore possible to simplify steps for manufacturing a liquid crystal display panel using the one drop filling method and to reduce the manufacturing cost of such a panel.

The invention is not limited to the above-described embodiments and may be modified in various ways.

For example, while VA mode liquid crystal displays have been referred to by way of example in the above-described embodiments, the invention is not limited to them and may be applied to other liquid crystal displays such as TN (Twisted Nematic) mode displays.

While transmissive liquid crystal displays have been referred to by way of example in the above-described embodiments, the invention is not limited to them and may be applied to other liquid crystal displays such as reflective or transflective displays.

While liquid crystal displays having color filters formed on a substrate provided opposite to a TFT substrate 2 have been referred to by way of example in the above-described embodiments, the invention is not limited to them and may be applied to liquid crystal displays having the so-called CF-on-TFT structure in which color filters are formed on a TFT substrate 2.

While active matrix liquid crystal displays have been referred to by way of example in the above-described embodiments, the invention is not limited to them and may be applied to passive matrix liquid crystal displays.

What is claimed is:

1. A liquid crystal display panel comprising:
    a pair of substrates combined together through a sealing material continuously applied to an entire peripheral portion thereof;
    a liquid crystal sealed between the pair of substrates;
    a picture-frame area in a form of a frame provided on the pair of substrates outside a display area and inside a region where the sealing material is formed;
    a light-shield film formed in the picture-frame area in a form of a frame surrounding the display area;
    a first conductive film formed in the picture-frame area on either of the pair of substrates and outside the light-shield film in a form of a continuously connected frame surrounding the display area and in the same layer with a pixel electrode formed at each pixel in the display area; and
    a second conductive film formed on the other of the pair of substrates and facing the first conductive film with the liquid crystal interposed between them.

2. A liquid crystal display panel according to claim 1, wherein at least one of the first or the second conductive film is electrically isolated from the pixel electrode.

3. A liquid crystal display panel according to claim 1, further comprising first and second terminal portions provided outside the region where the sealing material is formed and electrically connected to the first and second conductive films, respectively.

4. A liquid crystal display panel comprising:
    a pair of substrates combined together through a sealing material continuously applied to an entire peripheral portion thereof;
    a liquid crystal sealed between the pair of substrates;
    a picture-frame area in a form of a frame provided on the pair of substrates outside a display area and inside a region where the sealing material is formed;
    a light-shield film formed in the picture-frame area in a form of a frame surrounding the display area, wherein said light-shield film does not overlap the sealing material;
    a first conductive film formed in the picture-frame area on either of the pair of substrates and outside the light-shield film in a form of a continuously connected frame surrounding the display area and in the same layer with a pixel electrode formed at each pixel in the display area; and
    a second conductive film formed on the other of the pair of substrates and facing the first conductive film with the liquid crystal interposed between them.

5. A liquid crystal display panel according to claim 4, wherein at least one of the first or the second conductive film is electrically isolated from the pixel electrode.

6. A liquid crystal display panel according to claim 4, further comprising first and second terminal portions provided outside the region where the sealing material is formed and electrically connected to the first and second conductive films, respectively.

* * * * *